P. D. SHADE.
METALLIC GASKET.
APPLICATION FILED MAR. 25, 1907.

No. 908,893.

Patented Jan. 5, 1909.

Inventor
Parris David Shade.

Witnesses
J. C. Simpson.
M. T. Miller.

By Chandler & Chandler

Attorneys

UNITED STATES PATENT OFFICE.

PARRIS DAVID SHADE, OF SCHUYLER, PENNSYLVANIA.

METALLIC GASKET.

No. 908,893.     Specification of Letters Patent.     Patented Jan. 5, 1909.

Application filed March 25, 1907. Serial No. 364,403.

*To all whom it may concern:*

Be it known that I, PARRIS D. SHADE, a citizen of the United States, residing at Schuyler, in the county of Northumberland, State of Pennsylvania, have invented certain new and useful Improvements in Metallic Gaskets; and I do hereby declare the following to be a full, clear, and exact description of the invention, such as will enable others skilled in the art to which it appertains to make and use the same.

This invention has relation to metallic gaskets for joints or packings between the cylinder and cylinder-head of gasolene engines.

One of the chief troubles with metallic packings between the cylinder-heads and cylinders of gasolene engines, is that they blow out under a high degree of pressure, due to lack of cohesive or adhesive properties in consequence of which they offer little or no resistance to moving over the surfaces or bodies with which they are in contact.

It has been proposed to make gaskets for the purposes mentioned composed of alloys, and they have been employed with greater or less success; but objection is met with in their use because of their expense and the difficulty of making or obtaining them when needed, and securing them in suitable sizes. I have found that zinc possesses the requisite properties when subjected to heat of such degree as it will be when employed as a packing in the connection mentioned for the formation of a practically perfect packing.

Figure 1:
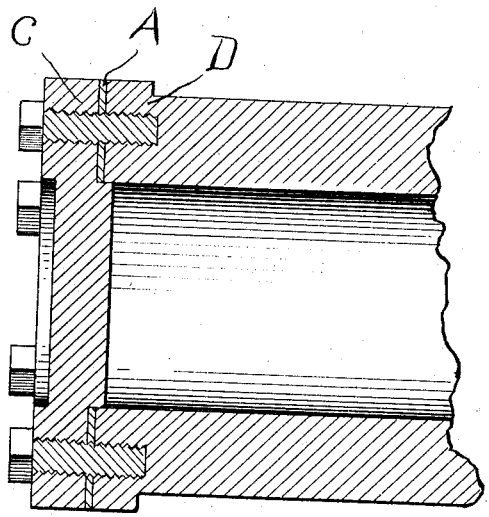
Figure 2:
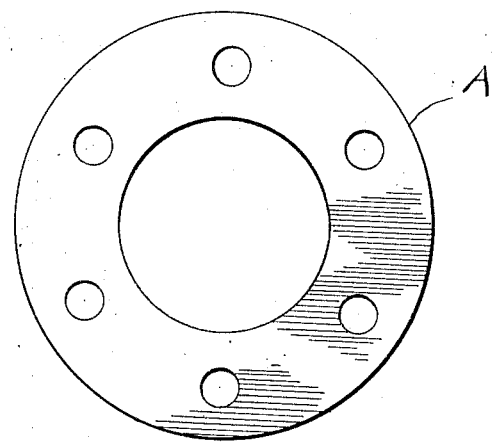

In the drawings hereto annexed and forming a part hereof, Figure 1 is a sectional view of the end of a gasolene engine showing my improvement as employed in connection therewith. Fig. 2 is a plan of the gasket separated from the cylinder.

In the formation of the gasket A, I usually stamp or cut it out of a sheet of zinc of suitable thickness in the form of a flat ring, as shown in Fig. 2. The process of making it, however, is immaterial to the invention, as is also indeed, its form, so long as it is composed of zinc, is suitable in shape and is compressed between the two bodies or surfaces C D of metal that are subjected to a high degree of heat.

When the gasket is employed as stated, it becomes appreciably soft and undergoes oxidation on its contacting surfaces which serves to corrode the iron to such degree as to cause the gasket to resist being moved over the surface of the iron, and consequently resist being blown or drawn out.

It is the peculiar properties of zinc aforesaid, in a compact metallic body that are developed in a packing when brought between highly heated surfaces that I have discovered and materialized, that comprises my invention or discovery. Nothing less than a zinc gasket or packing between highly heated surfaces, or surfaces that may be subjected to heat, or between the cylinders and cylinder heads of gasolene engines or similar objects, constitute the substantive invention discovered and brought into existence by me.

What is claimed is—

The combination, with an iron gas-engine cylinder and its iron cylinder-head, of a metal packing disposed and clamped between said cylinder and head, and oxidizable under a degree of heat equal to that to which the cylinder and head are subjected in common usage, whereby a union will be effected between the parts to prevent the packing from blowing out, said packing consisting of a gasket of zinc, substantially as set forth.

In testimony whereof, I affix my signature, in presence of two witnesses.

PARRIS DAVID SHADE.

Witnesses:
    M. T. MILLER,
    E. L. LYONS.